No. 12,401. REISSUED NOV. 7, 1905.

J. M. HOPKINS.

BEARING FOR CAR JOURNAL BOXES.

APPLICATION FILED FEB. 6, 1903.

3 SHEETS—SHEET 1.

Witnesses:
Lute S. Pitter
Arthur D. Seibold.

Inventor:
James M. Hopkins,
By Louis A. Gleason Atty.

No. 12,401. REISSUED NOV. 7, 1905.

J. M. HOPKINS.

BEARING FOR CAR JOURNAL BOXES.

APPLICATION FILED FEB. 6, 1903.

3 SHEETS—SHEET 2.

Witnesses:

Lida S. Alter

Arthur B. Seibold.

Inventor:

James M. Hopkins,

By Louis A. Geery Atty.

No. 12,401. REISSUED NOV. 7, 1905.

J. M. HOPKINS.

BEARING FOR CAR JOURNAL BOXES.

APPLICATION FILED FEB. 6, 1903.

3 SHEETS—SHEET 3.

Witnesses:
Lute S. Pelter.
Arthur B. Seibold.

Inventor:
James M. Hopkins.
By Louis A. Greene Atty

UNITED STATES PATENT OFFICE.

JAMES M. HOPKINS, OF CHICAGO, ILLINOIS, ASSIGNOR, BY MESNE ASSIGNMENTS, TO CLIMAX BEARING COMPANY, A CORPORATION OF MAINE.

BEARING FOR CAR JOURNAL-BOXES.

No. 12,401. Specification of Reissued Letters Patent. Reissued Nov. 7, 1905.

Original No. 663,094, dated December 4, 1900. Application for reissue filed February 6, 1903. Serial No. 142,232.

*To all whom it may concern:*

Be it known that I, JAMES M. HOPKINS, a citizen of the United States, and a resident of Chicago, county of Cook, and State of Illinois, have invented certain new and useful Improvements in Bearings for Car Journal-Boxes, of which the following is a specification, and which are illustrated in the accompanying drawings, forming a part thereof.

This invention has for its object to improve upon the construction of the brass and wedge or key employed in car journal-boxes; and it consists in the construction hereinafter fully described, and illustrated in the accompanying drawings, in which—

Figure 1:
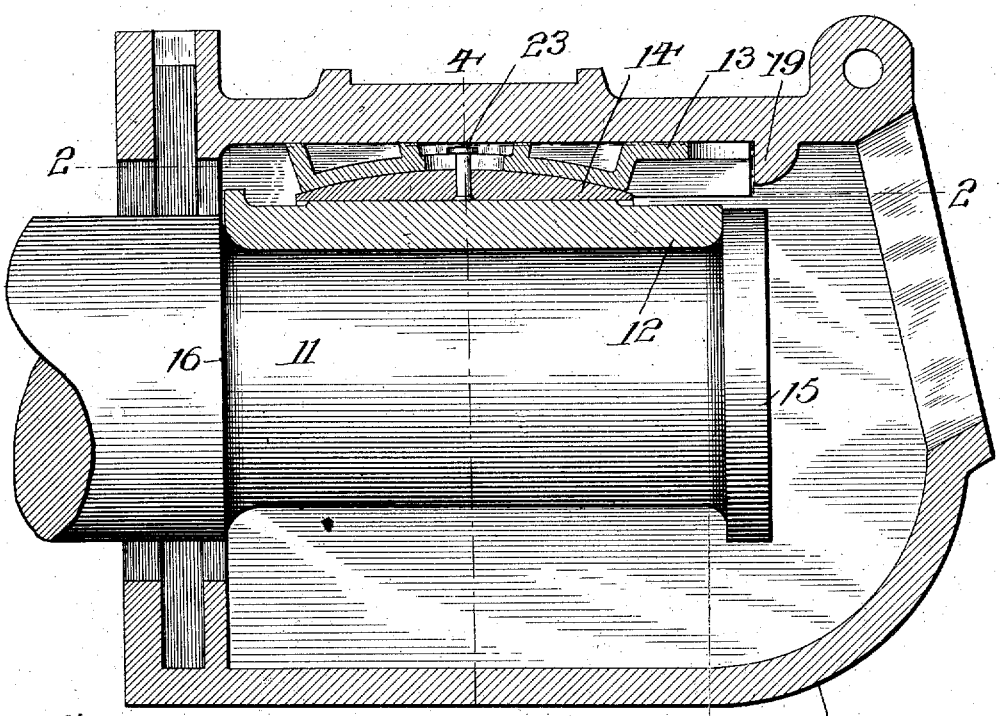
Figure 2:
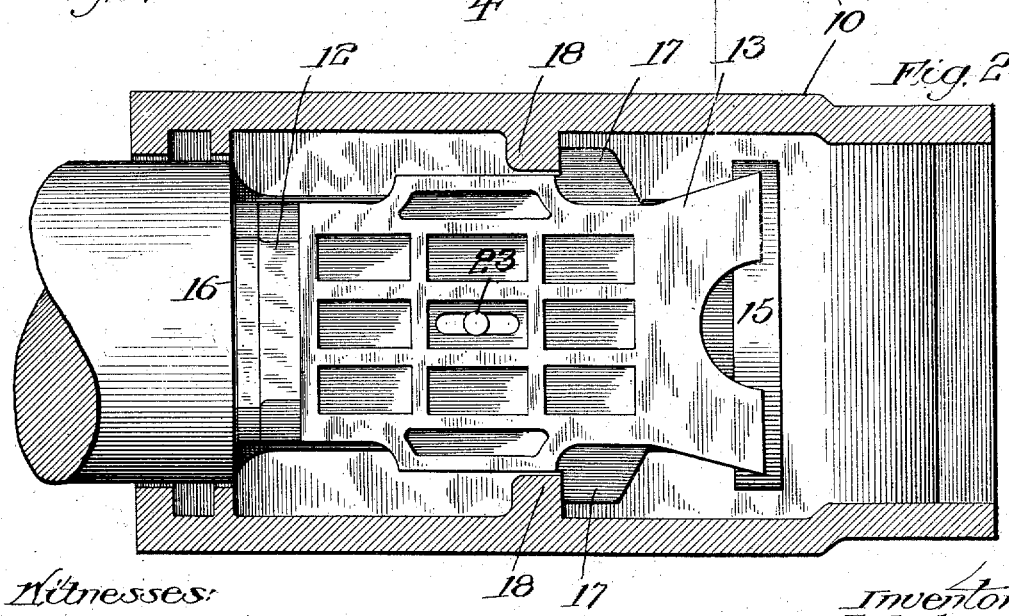
Figure 3:
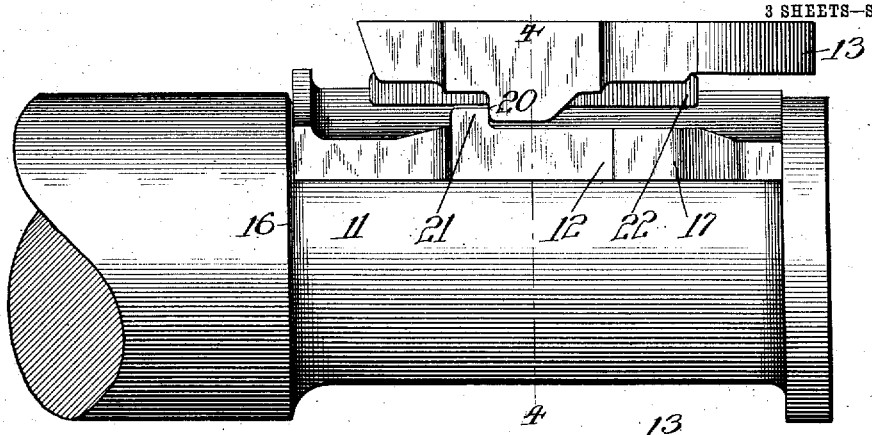
Figure 4:
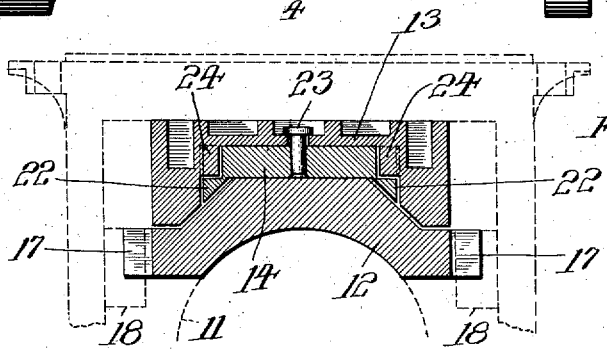
Figure 5:
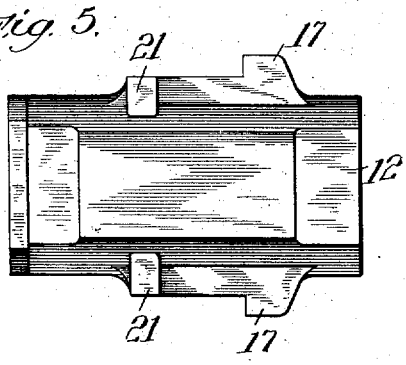
Figure 6:
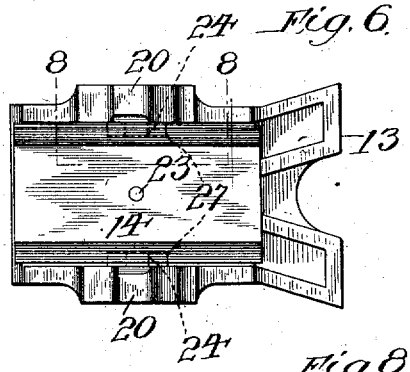
Figure 7:
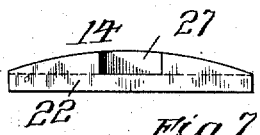
Figure 8:
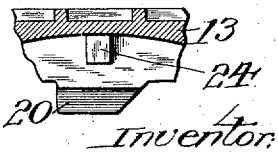
Figure 9:
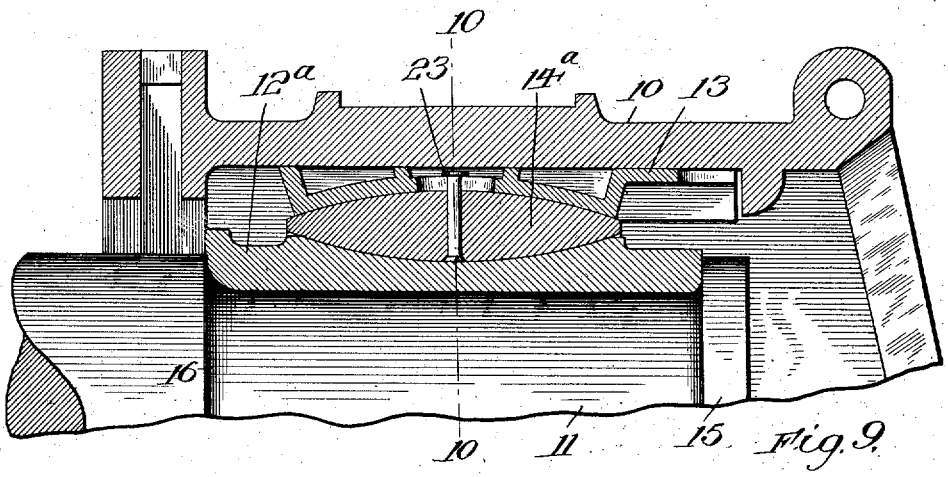
Figure 10:
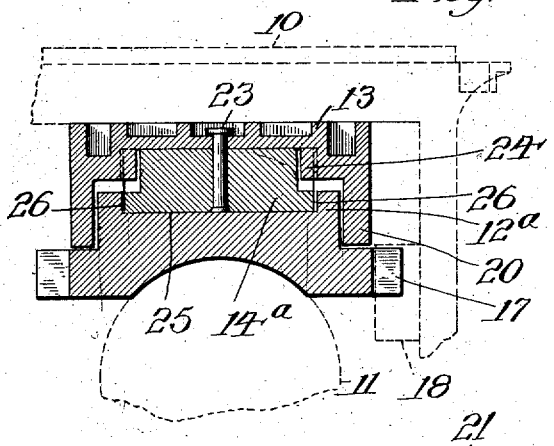
Figure 11:
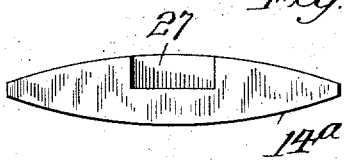
Figure 12:
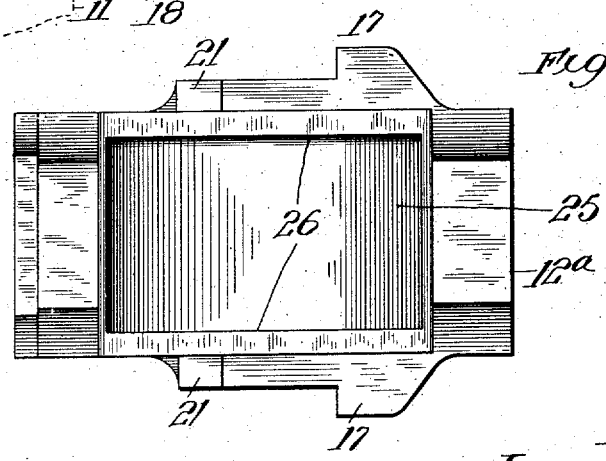

Figure 1 is a central vertical section of a journal-box and the brass and key, the car-axle being shown in elevation. Fig. 2 is a plan section on the line 2 2 of Fig. 1. Fig. 3 is a side elevation of the brass and key as applied to an axle. Fig. 4 is a transverse section of the brass and key, taken on the line 4 4 of Figs. 1 and 3, a detail of the journal-box being shown in dotted lines. Fig. 5 is a plan view of the brass. Fig. 6 is a bottom plan of the wedge. Fig. 7 is a side elevation of one of the members of the wedge. Fig. 8 is a detail section on the line 8 8 of Fig. 6. Figs. 9 to 12 show a modified form of construction, Fig. 9 being a detail longitudinal central section through the journal-box and the brass and wedge. Fig. 10 is a transverse section on the line 10 10 of Fig. 9. Fig. 11 is a side elevation of the slidable member, and Fig. 12 is a plan view of the brass.

The journal-box 10 and the car-axle 11 are of ordinary construction and form no part of the present invention. The brass 12 is adapted to fit between the shoulder 16, formed on the axle, and the flange 15 at the end thereof when such flange is present and is shown as having lateral longitudinal flanges at its lower edges. The key or wedge interposed between the brass and the parallel plate of the journal-box is composed of an upper member 13 and a lower member 14, the former fitting between the side walls of the box, so as to be incapable of lateral movement. The brass is provided with lateral lugs 17 17, adapted to bear against the outer faces of instanding lugs or ribs 18 18 on the side walls of the box 10, so that it is prevented from material backward movement with reference to the box. The front end of the upper member 13 of the wedge abuts against a depending lug 19 at the forward end of the top plate of the journal-box, and this member is provided with downwardly-projecting lugs 20, one at each side, adapted to bear against the front face of upstanding lugs 21, formed on the brass 12. It follows, therefore, that the brass and the upper member of the wedge are locked against any material forward movement relatively as to each other or as to the journal-box. The construction described provides for the anchoring, subject to slight play, of the brass to the axle and the wedge or key to the box and the interlocking of brass and wedge. While it is necessary to thus prevent any material longitudinal movement of the car-axle with reference to the journal-box, it is equally necessary to provide for the changes of the angular relation of these parts in a vertical plane parallel with the axle, due to the swaying of the car or any unevenness of the track, and particularly to provide for a proper transmission of the weight of the car-body to the axle whatever may be the angular relation of the latter with the box in this plane.

In the structure herein shown and described the top of the brass is made flat and smooth and the lower member 14 of the key is fitted thereto as a saddle, being provided with downwardly-projecting wing-pieces 22, one at each side, which engage the inclined side walls of the brass, and thereby prevent any lateral play of the two, while permitting free longitudinal movement. The upper face of the member 14 is longitudinally convex, and the lower face of the upper member 13 of the key is longitudinally concave with a corresponding curvature. If, therefore, there is a change in the angular relation in vertical plane of the brass and upper member of the key, so as to tend to throw the weight to one end of the member 14, the latter will be moved longitudinally in the opposite direction by a wedge action, thus allowing the members 12 and 13 to approach each other at the end at which there is a preponderance of weight, while interposing between the separated ends of these members the thicker portion of the intermediate member 14, so that there is at all times a wide distribution of the load. As soon as the parts 12 and 13 are restored to the parallel relation the intermediate member 14 slides backwardly by a shifting of the burden toward its opposite end, and hence there is an entire absence of undue straining of the parts.

For the purpose of preventing the two members 13 and 14 of the key from parting company when not in use it is desirable to set a rivet 23 through one of these members, providing a longitudinal slot in the other for it to travel in. As shown, this rivet is fixed in the member 14 and the slot is formed in the member 13, the rivet being provided with a head to prevent the parts from separating when out of service.

In order to prevent any accidental displacement of the movable member 14, stop-lugs are provided to limit its movement with reference to the member 13. As shown, such lugs 24 are formed upon the member 13, and recesses 27 are formed longitudinally in the sides of the member 14 for their accommodation, the length of these recesses being sufficient to allow all necessary play of the movable member, while the length of the slot in the member 13, which accommodates the rivet 23, is such that the lugs 24 will prevent the rivet from reaching the end of a slot.

The construction hereinbefore described is adapted to the requirements as to dimensions of the Master Car-Builders' Association. The hereinafter-described modification involves a slight increase of the distance between the journal-bearing face of the brass and the inner surface of the top of the journal-box in order that the parts may not be weakened. In this form of construction the upper member of the wedge 13 is of the same form as in the construction already described, but the lower member of the wedge, which is here designated at 14ª, is double convex, the curvature extending longitudinally, or, in other words, being segments of a cylinder. The brass 12ª differs from the brass 12 only in that its upper surface is concave, adapted to the curved under surface of the lower member of the wedge. In order that the brass may not be weakened, its body is somewhat thickened, and to prevent the member 14ª from lateral movement with reference to the brass the recess of the latter (shown at 25) is provided with side walls 26. The action of the device thus constructed is the same as in that previously described.

The construction herein shown and described not only provides for a more perfect action than any device of this class which has heretofore been known, but it is also more simple and cheaper than any device heretofore used.

I claim as my invention—

1. In a car-journal bearing, in combination, a brass having a flat upper surface, and a key comprising an upper member adapted to receive the bearing-surface of a journal-box and having a longitudinally-concave lower face, and a lower member interposed between the upper member and the brass and having its contacting faces conforming thereto and being in sliding engagement therewith.

2. In a car-journal bearing, in combination with a brass and a key member adapted to so interlock and to so engage a journal-box that neither is capable of material longitudinal movement, an intermediate key member having a flat bottom face and a longitudinally-convex top face, the faces of the two first-mentioned members which contact with such third member conforming thereto and being in sliding engagement therewith.

3. In a car-journal bearing, the combination, with a brass and a key member, each adapted to be fixed against material longitudinal movement, of a second key member interposed directly between such two first-mentioned members and having a longitudinally-convex face and being capable of free longitudinal movement, the meeting faces of the three members conforming each to the other.

4. In a car-journal bearing, in combination, a brass and a wedge member adapted to vary their angular relation in vertical plane, and a slidable member interposed therebetween, the wedge member being adapted to engage a journal-box to prevent its forward movement, the brass being adapted to engage a journal-box to prevent its backward movement, and the wedge and brass being interengaged to prevent the backward movement of the former and the forward movement of the latter.

5. In a car-journal bearing, in combination, a brass adapted to engage the walls of a journal-box to limit its backward movement, a wedge member adapted to engage a journal-box to limit its forward movement, such brass and wedge member interlocking intermediate of their ends to limit their forward and rearward movement respectively, but to permit them to change their angular relation longitudinally; and a slidable member interposed between the brass and wedge member.

6. In a car-journal bearing, in combination, a brass; a member slidable thereupon and having pendent lateral flanges, and having its upper face longitudinally convex; and a wedge member having its lower face concave complementary to the convex face of the slidable member and being adapted to engage the top wall of a journal-box.

7. In a car-journal bearing, in combination, a brass, a wedge member adapted to fit within the top of a journal-box so as to be incapable of angular movement relatively thereto, and a slidable member interposed between the brass and wedge member and engaging both to prevent their relative angular movement in a horizontal plane.

8. In combination, a car-journal bearing, and a wedge device comprising an element capable of a rocking motion relative to the bearing, such bearing having projecting lugs at its sides engaging the rocking wedge member.

9. In combination, a car-journal bearing, and a wedge device comprising an element capable of a rocking motion relative to the bearing, such bearing having lateral flanges and lugs rising therefrom for engaging the rocking wedge member.

10. In combination, a car-journal bearing, and a wedge device comprising a member capable of a rocking motion relative to the bearing, such bearing having an upstanding lug at each side for engaging the rocking wedge member.

11. In combination, a car-journal bearing, and a wedge device comprising a member capable of a rocking motion relative to the bearing, such bearing having lateral box-engaging lugs and upstanding lugs engaging the rocking wedge member.

JAMES M. HOPKINS.

Witnesses:
ARTHUR B. SEIBOLD,
S. H. CAMPBELL.